United States Patent Office 3,539,765
Patented Nov. 10, 1970

3,539,765
TUBULAR COMPOSITE ARC WELDING ELECTRODE
Robert B. Duttera, Spring Garden Township, York County, and William T. De Long, West Manchester Township, York County, Pa., assignors to The McKay Company, Pittsburgh, Pa., a corporation of Pennsylvania
No Drawing. Filed June 20, 1968, Ser. No. 738,658
Int. Cl. B23k 35/22
U.S. Cl. 219—146                          18 Claims

ABSTRACT OF THE DISCLOSURE

A tubular composite automatic and semi-automatic arc welding electrode for porducing non-austenitic mild and alloyed steel weld deposits of improved impact strength comprising a steel sheath formed into tubular shape and enclosing a core comprising the following listed components in the specified weight percentages of the electrode: 5–60% of material commonly used in the art according to the welding process employed, such as arc stabilizers, fluxing agents, atmosphere generators, deoxidizer metals, metals and metal alloys, and .2–3% of magnesium in metallic form. Preferred forms of the electrode contain .3–1% of magnesium in metallic form.

---

This invention relates to tubular composite automatic and semi-automatic arc welding electrodes used in continuous lengths for the weld deposition of non-austenitic grades of mild and alloy steel of superior impact strength.

Tubular electrodes are commonly prepared by forming a thin iron or steel strip into a tubular sheath and enclosing core materials within this sheath. Such electrodes are used in the submerged flux process, in gas-shielded metal-arc welding and in self-shielded metal-arc welding. Depending upon the requirements imposed by the process and upon the chemical and physical properties desired in the weld metal the core materials are selected from six general classes which are shown below with examples of each.

| Core materials | Examples |
|---|---|
| Arc stabilizers | Titanates of potassium and other metals. Silico fluorides of potassium and other metals. fluoaluminates of sodium and other metals. |
| Fluxing agents | Fluorides of calcium, sodium and other metals. |
| Atmosphere generators | Carbonates of calcium, barium and other metals. Carbon |
| Deoxidizer metals | Manganese. Ferromanganese. Silicon. Ferrosilicon. Aluminum. Titanium. Titanium ferroalloy. Zirconium. |
| Metals and metal alloys | Nickel. Chromium. Ferrochromium. Ferromolybdenum. Steel powder. Iron powder. Metallic oxides at least partly reducible in the welding arc to metals as oxides of manganese and nickel. |
| Slag formers | Silica. Rutile. Feldspar. Wollastonite. Zircon. Zirconia. Oxide residues from carbonates. |

Slag formers of the last category include core materials ending up in the welding slag after performing their primary function. Also included are slag bulking agents such as minerals like wollastonite added to adjust the slag to a preferred volume but not critical to the electrode's performance. Such optional additions, neutral to the welding functions, are not considered in the description of this invention.

A single core material may contribute to more than one function; for example, an alkali metal titanate arc stabilizer may also become a slag former; a metal carbonate may be an atmosphere generator and the metal oxide residue then becomes a slag former; ferrotitanium, a strong deoxidizer metal, also acts as an arc stabilizer.

The core materials commonly comprise 10–60% of the finished electrode and together with the sheath and any external atmosphere or flux determine the chemical and physical properties of the finished weld deposit.

During the development of tubular composite arc welding electrodes porosity control in certain systems and analyses was a persistent problem. Electrodes suitable for each welding process have been developed and marketed by finding successful balances of the core materials cited above. This is due in large measure to the developement of well balanced deoxidizer metal contents and the formulation of the core to obtain this desired result is well known in the art and many versions have been disclosed previously.

Another of the problems that have arisen prior to our invention is to obtain the desired toughness in weld deposits produced by the prior tubular composite arc welding electrodes. The austenitic metals as a class have moderate strength but possess good ductility and impart resistance and tubular electrodes produce weld deposits which match these desirable properties and are used without complaint. However the non-austenitic electrodes, particularly the mild and the alloyed high strength steels characterized by martensite-bainite-ferrite type deposit structures, often do not satisfy the user. The welding art is now able to deliver electrodes which produce porosity free deposits with physical properties satisfactory except for impact strength and there is constant pressure by the users for weld deposits of higher and still higher impact strength. For example, in many applications of mild and low alloy steels the toughness of the weld metal as measured by the Charpy V-notch impact test is the critical property. If the weld deposit does not have the desired toughness a structure fabricated therewith may fail catastrophically in service. For example, electrodes conforming to the highest toughness requirement of specification AWS A5.18–65T (ASTM A 559–65T) for mild steel electrodes for gas metal-arc welding must have a minimum weld metal Charpy V-notch impact strength of 20 ft.-lbs. at −20° F. Other classifications covered by the specification have less stringent requirements. However, for many applications this toughness level of 20 ft.-lbs. at −20° F. is not sufficient for the engineering uses desired of the weld deposit and difficulties have been encountered in developing electrodes to exceed these minimal requirements by a significant amount.

The Charpy V-notch test conditions can be made increasingly severe by lowering the temperature at which the impact test is carried out. Low test temperatures are specified when the weld is intended for low temperature service or when a larger margin of safety is required of a deposit intended for normal temperature use.

Of the three general welding processes previously mentioned which may use tubular composite electrodes the submerged arc process requires the least of the electrode only that it supply elements for the required deposit chemistry plus weld deoxidizer metals since other functions can be handled by the flux. For other processes the tubular electrodes must carry additional materials from the above list to handle additional functions. While there is much skill and art in choosing the electrode core compositions which perform the required functions in the most attractive manner, experience has led to commercial electrodes in each category which are considered successful and which meet present specifications. However there is an urgent need for electrodes with higher impact strength non-austenitic steel deposits on the part of the user who has available plate with better properties than the weld.

We have discovered that tubular composite electrodes formulated for use in one of the welding processes can be made to produce deposits of increased impact strength when a small percentage of metallic magnesium is added to the list of core materials. The magnesium may be in pure or alloy form and to make room for it a small adjustment may be made as in the content of the iron powder which customarily acts as a filler.

Significant improvements in weld metal toughness are achieved when up to 3% metallic magnesium is included in the core materials of a properly balanced electrode. The addition of metallic magnesium is particularly effective in composite electrode types which represent the best toughness levels attainable with the prior art using conventional materials and observing sound welding principles.

These types include gas-shielded electrodes with fluoride base and lime-fluoride base slag systems and gas-shielded and submerged arc electrodes of the low-flux and fluxless types. The incorporation of metallic magnesium will not of itself cancel the well known usual harmful effects on weld deposits of excess amounts of such elements as phosphorus, sulfur, titanium and aluminum. In order to achieve a maximum benefit the practice of sound metallurgical principles and other rules well known to the welding art must still be observed and the deposit chemistry must be balanced in carbon and alloy content appropriate to the strength range desired. Metallic magnesium must be used in tubular composite electrodes with care and as taught but when so used it can be made to produce striking improvements in impact strength of weld deposits. When used according to the teaching of this invention metallic magnesium may best be employed to dramatically improve a weld deposit which is already good by previous standards. No benefit has been found from its use in titania base tubular electrodes of the lowest quality levels whose deposits retain heavy loads of deoxidation metals to resist porosity under all conditions of welding and whose impact strength is very low. From a metallurgical standpoint such deposit areas are believed unredeemable and magnesium simply acts as an additional deoxidizer metal. A tubular electrode incorporating magnesium alone would be worthless; however by taking a non-austenitic electrode whose composition enables it to meet or almost meet a current performance specification for tubular composite electrodes and by including up to 3% metallic magnesium in the core an improvement in deposit toughness has been secured in case after case.

The important relationship of weld metal deoxidation practice to both porosity and impact strength has long been recognized and much of the welding art has been concerned with its management. By all the principles of welding magnesium must be classed as a strong deoxidizer metal but we have discovered that it can be made to show effects on impact strength which are peculiar to itself and which are not produced by other deoxidizer metals such as aluminum and titanium with which the prior art has grouped it.

The best way to reveal these hitherto unrecognized and unique properties, and the easiest and most reliable way to employ metallic magnesium according to our teachings, is to start with a tubular composite electrode of the type referred to and already typical of the present state of the art in its general welding performance. While such an electrode may weld satisfactorily and deliver the 20 ft.-lbs. impact strength required by the A.W.S. specification it will typically resist efforts to improve this value significantly through the manipulation of the type and amount of conventional deoxidizer metal content. The effectiveness of metallic magnesium can be shown by removing all deoxidizing metal from the core, then adding a typical quantity of magnesium powder such as 0.6% of the electrode weight and then restoring the deoxidizing metal content in steps while making tests of the impact strength. In restoring the deoxidizing metal content it is best to emphasize the moderately strong elements such as maganese and silicon and avoid or use sparingly other very strong metals such as aluminum and titanium which are easy to overdo. By placing reliance on magnesium as a strong deoxidizer and supporting it with other less vigorous back-up deoxidizer metals the test program described will break through the old ceiling on impact strength and will often effect improvements of as much as 100%.

Although the exact mechanism by which magnesium improves a weld deposit to greater toughness is not known it is believed that the strong affinity of magnesium for oxygen is at least in part responsible. It has not been possible to determine exactly if magnesium lowers the actual oxygen content of the weld metal or if the magnesium ties up oxygen in the weld in a less harmful form than do other deoxidizing elements which fail to needle impact strength as magnesium can. However, we have found

TABLE I.—EXAMPLES OF BENEFICIAL EFFECT OF MAGNESIUM

|  | Gas-shielded electrode | | Gas-shielded electrode | | Submerged-arc electrode | | | | Gas-shielded electrode | |
|---|---|---|---|---|---|---|---|---|---|---|
|  | I-A | I-B | II-A | II-B | III-A | III-B | III-C | III-D | IV-A | IV-B |
| Electrode diameter, in | 7/64 | 7/64 | 3/32 | 3/32 | 1/8 | 1/8 | 1/8 | 1/8 | 1/16 | 1/16 |
| Electrode composition, weight percent: | | | | | | | | | | |
| Magnesium metal | 0 | .8 | 0 | 0.6 | 0 | 0.2 | 0.7 | 0.9 | 0 | 0.6 |
| Potassium silicofluoride | .4 | .4 | .4 | | | | | | | |
| Potassium titanate | .4 | .4 | | 0.2 | | | | | 0.2 | 0.2 |
| Calcium carbonate | .8 | .8 | .8 | 0.8 | | | | | | |
| Calcium fluoride | 4.0 | 4.0 | 4.0 | 4.7 | 2.0 | 2.0 | 2.0 | 2.0 | | |
| Iron powder | 14.4 | 13.6 | 7.7 | 7.7 | 17.0 | 17.0 | 17.0 | 17.0 | 9.2 | 8.6 |
| Ferromanganese (80% Mn) | 1.3 | 1.3 | 2.1 | 1.0 | 1.6 | 1.4 | 0.9 | 0.8 | 1.4 | 1.4 |
| Ferrosilicon (50% Si) | 1.8 | 1.8 | 1.5 | 1.4 | 0.6 | 0.6 | 0.6 | 0.6 | 1.3 | 1.3 |
| Ferromolybdenum (60% Mo) | 0.9 | .9 | 0.7 | 0.7 | 0.9 | 0.9 | 0.9 | 0.9 | 0.7 | 0.7 |
| Ferrochromium (70% Cr) | | | 0.6 | 0.6 | | | | | 0.6 | 0.6 |
| Manganese powder | | | | 0.6 | | | | | | |
| Nickel powder | | | 2.0 | 2.0 | 0.9 | 0.9 | 0.9 | 0.9 | 1.7 | 1.7 |
| Carbon steel sheath | Bal. | Bal. | Bal. | Bal. | Bal. | Bal. | Bal. | Bal. | Bal. | Bal. |
| Typical welding conditions: | | | | | | | | | | |
| Voltage, volt | 27 | 27 | 26 | 26 | 28 | 28 | 28 | 28 | 20 | 20 |
| Current, amp | 450 | 450 | 400 | 400 | 450 | 450 | 450 | 450 | 200 | 200 |
| Travel speeds i.p.m | 22 | 22 | 22 | 22 | 22 | 22 | 22 | 22 | 10 | 10 |
| Shielding medium | (1) | (1) | (1) | (1) | (2) | (2) | (2) | (2) | (3) | (3) |
| Impact strength of weld in ft.-lbs. at: | | | | | | | | | | |
| Room temperature | 70 | 118 | 52 | 85.3 | 61.5 | 66.8 | 79.5 | 79.5 | 54.4 | 92.8 |
| +10° F | | 74 | | | | | | | | |
| −20° F | 25 | 46 | | | | | | | | |
| −40° F | | 48 | | | | | | | | |
| −60° F | | | 27.3 | 50.8 | 17.3 | 28 | 38.3 | 41 | 35.1 | 43.3 |
| −100° F | | | 24.6 | 29 | 12.8 | 26 | 31.3 | 26.3 | 25.1 | 32 |
| −150° F | | | 15.2 | 13 | 3.5 | 8 | 10 | 12 | 9.5 | 15 |

[1] $CO_2$ at 40 c.f.h.  [2] UM-80 flux.  [3] 75% argon +25% $CO_2$ at 25 c.f.h.

magnesium to confer a phenomonally beneficially effect on tubular electrodes now representative of the current state of the art and while every metal deoxidizing toward iron quantities of magnesium can exert on impact strength has time in tubular electrodes the specific effect which small quantitis of magnesium can exert on impact strength has not heretofore been recognized and used in the welding art.

Table I illustrates by examples the beneficial effects on the impact strenth of weld deposits which have been obtained by additions of magnesium metal to tubular automatic welding electrodes. Electrodes III–A, III–B, III–C and III–D are a group of low flux type submerged arc electrodes the first of which is a base composition to which increasing amounts of magnesium have been added in three steps. These electrodes which carry a little calcium fluoride for improved fluxing are formulated for use with a submerged flux such as Unionmelt No. 80 which was employed in the comparison tests. When weld deposited under the typical conditions shown all of these electrodes will deliver 20 ft.-lbs. at −20° F. but the base number II–A fails to do so at −60° F. whereas magnesium additions of .2, .7 and .9 percent produced impact values at this temperature of 28, 38.3 and 41 ft.-lbs. respectively. In fact the conventional value of 20 ft.-lbs. was delivered at −100° F. even by the lowest magnesium addition of only .2%.

Electrode pairs I–A, I–B and II–A, II–B represent a lime-fluoride base type of gas shielded tubular electrode with a core composition selected to perform a number of functions including slag formation. Such electrodes operate under a carbon dioxide shielding gas with a spray or globular type transfer. Compared with the first member of each pair the second member illustrates the large improvement in impart strength secured by a small addition of magnesium to the electrode. The deposit of I–B is almost double that of I–A at −20° F.; the impact strength of II–B is also nearly twice that of II–A and is produced by the magnesium addition although in this case the demonstration is somewhat clouded by small readjustments in other components.

As further examples of this invention tubular electrodes IV–A and IV–B of Table I represent a gas shielded fluxless electrode type formulated for dip transfer welding use under an atmosphere of argon and carbon dioxide. Electrode IV–B with 0.6% added magnesium has at least 30% higher impact strength than electrode IV–A.

The beneficial effect on the impact strength of weld deposits through additions of magnesium metal to the core material is clearly shown by the data in Table I. Improvements of as much as 100% have been achieved in the impact strength of welds deposited with composite electrodes containing magnesium metal in the electrode core. This beneficial effect was not heretofore recognized. If the amount of magnesium in the core composition is increased to higher levels than those shown in Table I the impact strength will not increase proportionately. If more than about 3% magnesium metal is added to the electrode the operation of the electrode is usually impaired and no benefit is received. Weld spatter is increased and the arc becomes noisy and erratic; therefore we prefer to limit the amount of magnesium to about 3% of the electrode. For economic reasons preferred forms of the electrode use from about 0.2% to to about 2% of magnesium in the electrode.

By way of further illustration four additional examples of tubular composite electrodes incorporating the use of metallic magnesium in the core as taught by us are cited in Table II.

Examples 1 and 4 are lime-fluoride base types formulated for the carbon dioxide shielded process. Examples 2 and 3 are both flux free types, Example 2 being for carbon dioxide shielding and Example 3 for submerged flux use. In each case the addition of magnesium has been utilized to produce significant improvements in the weld metal toughness and enables the deposits to far exceed the present A.W.S. specification covering composite electrodes.

TABLE II.—FURTHER EXAMPLES OF BENEFICIAL EFFECT OF MAGNESIUM

|  | 1 | 2 | 3 | 4 |
|---|---|---|---|---|
| Electrode diameter, in | 1/16 | 1/16 | 1/8 | 3/32 |
| Electrode composition, weight percent: | | | | |
| Magnesium metal | 0.4 | 0.6 | 0.9 | 1.0 |
| Potassium titanate | 0.4 | | | 0.4 |
| Potassium silicofluoride | 0.4 | | | |
| Calcium carbonate | 0.8 | | | 0.8 |
| Calcium fluoride | 4.0 | | | 4.1 |
| Iron powder | 9.9 | 8.8 | 19.0 | 7.4 |
| Ferromanganese (80% Mn) | 0.8 | 1.4 | 0.8 | |
| Ferrosilicon (50% Si) | 1.6 | 1.3 | 0.6 | 1.0 |
| Ferromolybdenum (60% Mo) | 0.9 | 0.7 | 0.9 | 0.7 |
| Ferrochromium (70% Cr) | | 0.6 | | 0.6 |
| Manganese powder | | | | 1.5 |
| Nickel powder | | 1.7 | 0.9 | 2.0 |
| Carbon steel sheath | Bal. | Bal. | Bal. | Bal. |

While we have described certain preferred embodiments of the invention it is to be distinctly understood that the invention is not limited thereto but may be otherwise variously embodied within the scope of the following claims.

We claim:

1. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form and from about 9% to about 18% of metal bearing material selected from the group consisting of metals, metal alloys, ferro-alloys and metal oxides at least in part reducible to metals and containing in the specified weight percentages of the electrode from about 0.4% to about 0.9% silicon
from about 0.3% to about 1.6% manganese
from about 0.3% to about 0.6% molybdenum
from about 0.2% to about 0.7% chromium
from about 1% to about 2.2% nickel
from about 5.5% to about 14% iron and
from about .01% to about 0.10% carbon.

2. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form and from about 18% to about 26% of metal bearing material selected from the group consisting of metals, metal alloys, ferro-alloys and metal oxides at least in part reducible to metals and containing in the specified weight percentages of the electrode up to about 0.5% silicon
from about 0.1% to about 1.2% manganese
from about 0.3% to about 0.8% molybdenum
from about 0.6% to about 1.3% nickel
from about 15.5% to about 24.5% iron and
from about 0.01% to about 0.10% carbon.

3. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form, from about 0.1% to about 0.4% of at least one arc stabilizer selected from the group consisting of metal titanates, metal silicofluorides and metal fluoaluminates and from about 9% to about 17% of metal bearing material selected from the group consisting of metals, metal alloys, ferro-alloys and metal oxides at least in part reducible to metals and containing in the specified weight percentages of the electrode from about 0.4% to about 0.9% silicon
from about 0.3% to about 1.6% manganese
from about 0.2% to about 0.6% molybdenum
from about 0.2% to about 0.7% chromium
from about 1% to 2.2% nickel
from about 5% to about 13% iron and
from about 0.01% to about 0.10% carbon.

4. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form, from about 1.4% to about 2.3% of metal fluoride and from about 17% to about 23% of metal bearing material selected from the group consisting of metals, metal alloys, ferro-alloys and metal oxides at least in part reducible to metals and containing in the specified weight percentages of the electrode up to about 0.5% silicon
from about 0.1% to about 1.2% manganese
from about 0.3% to about 0.8% molybdenum
from abolt 0.6% to about 1.3% nickel
from about 14.5% to about 22% iron and
from about 0.01% to about 0.10% carbon.

5. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form, from about 0.1% to about 1.1% of at least one arc stabilizer selected from the group consisting of metal titanates, metal silicofluorides and metal fluoaluminates, from about 3.5% to about 6% of metal fluoride, from about 0.6% to about 1.3% of metal carbonate and from about 9% to about 18% of metal bearing material selected from the group consisting of metals, metal alloys, ferro-alloys and metal oxides at least in part reducible to metals and containing in the specified weight percentages of the electrode from about 0.6% to about 1.1% silicon
from about 0.2% to about 1.6% manganese
from about 0.4% to about 0.7% molybdenum
from about 5.5% to about 16% iron and
from about 0.01% to about 0.30% carbon.

6. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form, from about 0.1% to about 1.1% of at least one arc stabilizer selected from the group consisting of metal titanates, metal silicofluorides and metal fluoaluminates, from about 3.5% to about 6% of metal fluoride, from about 0.6% to about 1.3% of metal carbonate and from about 9% to about 18% of metal bearing material selected from the group consisting of metals, metal aloys, ferro-aloys and metal oxides at least in part reducible to metals and containing in the specified weight percentages of the electrode from about 0.4% to about 1.1% silicon
from about 0.2% to about 1.6% manganese
from about 0.2% to about 0.7% molybdenum
from about 0.2% to about 0.7% chromium
from about 1% to about 2.2% nickel
from about 5% to about 15% iron and
from about 0.01% to about 0.30% carbon.

7. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form, from about 3.5% to about 6% of metal fluoride, from about 0.6% to about 1.3% of metal carbonate and from about 9% to about 18% of metal bearing material selected from the group consisting of metals, metal alloys, ferro-alloys and metal oxides at least in part reducible to metals and containing in the specified weight percentages of the electrode from about 0.6% to about 1.1% silicon
from about 0.2% to about 1.6% manganese
from about 0.4% to about 0.7% molybdenum
from about 5.5% to about 16% iron and
from about 0.01% to about 0.10% carbon.

8. A tubular composite arc welding electrode for producing non-austenitic mild and alloyed steel weld deposits of improved impact strength comprising a steel sheath formed into tubular shape and enclosing a core comprising the following listed components in the specified weight percentages of the electrode: from about 0.3% to about 1% of magnesium in metallic form, from about 3.5% to about 6% of metal fluoride, from about 0.6% to about 1.3% of metal carbonate and from about 9% to about 18% of metal bearing material selected from the group consisting of metals, metal alloys, ferro-alloys and metal oxides at least in part reducible to metals and containing in the specified weight percentages of the electrode from about 0.4% to about 1.1% silicon
from about 0.2% to about 1.6% manganese
from about 0.2% to about 0.7% molybdenum
from about 0.2% to about 0.7% chromium
from about 1% to about 2.2% nickel
from about 5% to about 15% iron and
from about 0.01% to about 0.30% carbon.

9. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 3% of magnesium in metallic form and from about 5% to about 60% of metal bearing material selected from the group consisting of metals, metal alloys, ferro-alloys and metal oxides at least in part reducible to metals, the balance of the weight of the electrode being the weight of the steel sheath.

10. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 2% of magnesium in metallic form and from about 5% to about 35% of metal bearing material selected from the group consisting of metals, metal alloys, ferro-alloys and metal oxides at least in part reducible to metals, the balance of the weight of the electrode being the weight of the steel sheath.

11. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 3% of magnesium in metallic form, up to about 1.5% of at least one arc stabilizer selected from the group consisting of metal titanates, metal silicofluorides and metal fluoaluminates and from about 4% to about 60% of metal bearing material selected from the group consisting of metals, metal alloys, ferro-alloys and metal oxides at least in part reducible to metals, the balance of the weight of the electrode being the weight of the steel sheath.

12. A tubular composite arc welding electrode for producing non-austenitic mild and alloyed steel weld deposits of improved impact strength comprising a steel shearth formed into tubular shape and enclosing a core consisting essentially of the following listed components in the specified weight percentages of the electrode: from about 0.2% to about 3% of magnesium in metallic form, up to about 9% of metal fluoride and from about 4% to about 60% of metal bearing material selected from the group consisting of metals, metal alloys, ferro-alloys and metal oxides at least in part reducible to metals, the balance of the weight of the electrode being the weight of the steel sheath.

13. A tubular composite arc electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 2% of magnesium in metallic form, from about 0.7% to about 3% of metal fluoride and from about 12% to about 35% of metal bearing material selected from the group consisting of metals, metal alloys, ferro-alloys and metal oxides at least in part reducible to metals, the balance of the weight of the electrode being the weight of the steel sheath.

14. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 3% of magnesium in metallic form, up to about 3.6% of at least one arc stabilizer selected from the group consisting of metal titanates, metal silicofluorides and metal fluoaluminates, up to about 30% of metal fluoride, up to about 3% of metal carbonate and from about 4% to about 60% of metal bearing material selected from the group consisting of metals, metal alloys, ferro-alloys and metal oxides at least in part reducible to metals, the balance of the weight of the electrode being the weight of the steel sheath.

15. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 3% of magnesium in metallic form, up to about 30% of metal fluoride, up to about 3% of metal carbonate and from about 4% to about 60% of metal bearing material selected from the group consisting of metals, metal alloys, ferro-alloys and metal oxides at least in part reducible to metals, the balance of the weight of the electrode being the weight of the steel sheath.

16. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 2% of magnesium in metallic form, from about 2% to about 15% of metal fluoride, from about 0.1% to about 2% of metal carbonate and from about 5% to about 23% of metal bearing material selected from the group consisting of metals, metal alloys, ferro-alloys and metal oxides at least in part reducible to metals, the balance of the weight of the electrode being the weight of the steel sheath.

17. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 2% of magnesium in metallic form, up to about 1.3% of at least one arc stabilizer selected from the group consisting of potassium titanate, potassium silicofluoride and sodium fluoaluminate and from about 4% to about 24% of metal bearing material selected from the group consisting of metals, metal alloys, ferro-alloys and metal oxides at least in part reducible to metals, the balance of the weight of the electrode being the weight of the steel sheath.

18. A tubular composite arc welding electrode for producing non-austenitic mild and alloyed steel weld deposits of improved impact strength comprising a steel sheath formed into tubular shape and enclosing a core consisting essentially of the following listed components in the specified weight percentages of the electrode: from about 0.2% to about 2% of magnesium in metallic form, from about 0.1% to about 2% of at least one arc stabilizer selected from the group consisting of potassium titanate, potassium silicofluoride and sodium fluoaluminate, from about 2% to about 15% of metal fluoride, from about 0.1% to about 2% of metal carbonate and from about 5% to about 23% of metal bearing material selected from the group consisting of metals, metal alloys, ferro-alloys and metal oxides at least in part reducible to metals, the balance of the weight of the electrode being the weight of the steel sheath.

References Cited

UNITED STATES PATENTS 3,177,340    4/1965    Danhier _____ 219—146
3,181,970    5/1965    Peck et al. _____ 219—146.8

JOSEPH V. TRUHE, Primary Examiner

L. A. ROUSE, Assistant Examiner

UNITED STATES PATENT OFFICE
CERTIFICATE OF CORRECTION

Patent No. 3,539,765    Dated November 10, 1970

Inventor(s) Robert B. Duttera et al.

It is certified that error appears in the above-identified patent and that said Letters Patent are hereby corrected as shown below:

In the heading to the printed specification, lines 6 to "assignors to The McKay Company, Pittsburgh, Pa., a corporat of Pennsylvania" should read -- assignors, by mesne as$ignme: Teledyne, Inc., Los Angeles, Calif., a corporation of Delawa Column 1, line 15, [the second line of the ABSTRACT OF THE DISCLOSURE], "porducing" should read -- producing --. Column line 65, after "electrode" insert a dash. Columns 3 and 4, Table I the line beginning "Shielding medium" should read -- Shielding medium (1) (1) (1) (1) (2) (2) (2) (2) (3) (3) the line beginning "Room temperature" should read -- Room temperature 70  118  53  85.3  61.5  66.8  79.5  79.5  54.4  92.8 --. Column 5, line 1, "beneficially" should read -- beneficial --; line 4, "quantities of magnesium can exert on impact strength has" should read -- has been proposed for us and undoubtedly tried at some --; line 6, "quantitis" should read -- quantities --; line 10. "strenth" should read -- strength --; line 21, "II-A" should read -- III A --; line 2! cancel the comma after "20 ft.-lbs." Column 7, line 7, after "to" insert -- about --; line 27, "abolt" should read -- abou --; line 65, "aloys, ferro-aloys" should read -- alloys, fer alloys --. Column 9, line 9, "shearth" should read -- sheath line 19, before "electrode" insert -- welding --.

Signed and sealed this 16th day of March 1971.

(SEAL)
Attest:

EDWARD M.FLETCHER,JR.                WILLIAM E. SCHUYLER, JI
Attesting Officer                    Commissioner of Patent: